United States Patent Office 3,206,496
Patented Sept. 14, 1965

---

3,206,496
QUATERNARY PHOSPHORUS COMPOUNDS AND METHOD OF PREPARING SAME
Michael M. Rauhut, Norwalk, Conn., assignor to American Cyanamid Company, New York, N.Y., a corporation of Maine
No Drawing. Filed Sept. 6, 1960, Ser. No. 53,902
9 Claims. (Cl. 260—464)

The present invention relates to organophosphorus compounds and methods of preparing same. More particularly, the instant discovery concerns polymeric phosphonium salts and dimeric phosphonium salts, said compounds having, respectively, the following structural configurations in the molecule

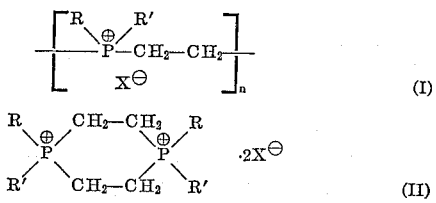

(I)

(II)

wherein R and R' in the above formulae represent, respectively, a member selected from the group consisting of substituted and unsubstituted, branched and straight chain saturated alkyl having from 1 to 12 carbon atoms, and substituted and unsubstituted saturated cycloalkyl, typical substituents being cyano, phenyl, lower alkoxy, carbalkoxy, carboxy, sulfo, amido, and the like; X is an anion selected from the group consisting of halogen (chlorine, bromine, iodine and fluorine), sulfate, phosphite, phosphate, tetraphenylboride,

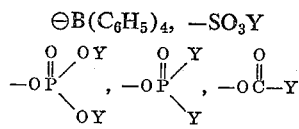

Y in said moieties being phenyl, alkyl having 1 to 18 carbon atoms, and alkenyl having 1 to 18 carbon atoms; and $n$ represents a value of at least 2. When $n$ is 2 the dimeric phosphonium salt has the cyclic structure of Formula II, above. Furthermore, R and R' in any given molecule can be identical or different moieties.

In accordance with the present invention a secondary phosphine having the structural formula

(III)

wherein R and R' have the meaning given above, is brought into reactive contact at a temperature in the range of 30° C. to 200° C. with a vinyl ester or halide of the formula $$CH_2=CH-A \qquad (IF)$$

wherein A is halogen (bromine, chlorine, iodine and fluorine) and

Y being the same as above in the product formulae, in the presence of a free radical initiator which under the conditions of the reaction is non-oxidizing with respect to the secondary phosphine reactant.

As will be seen hereinafter in greater detail, the corresponding product of Formula I, above, results when conducting this reaction at a temperature in the range of 30° C. to 85° C., for example, for at least one hour. On the other hand, when a temperature in the range of 120° C. to 200° C. is employed for at least one hour, the corresponding product of Formula II, above, results. The anions X of Formulae I and II may be varied considerably by anion exchange to yield the broad spectrum of products contemplated herein, as will also be shown in detail hereinafter.

Typical vinyl esters and halides contemplated herein are: vinyl chloride, vinyl bromide, vinyl iodide, vinyl fluoride, vinyl acetate, vinyl 2-ethylhexanoate, vinyl hexahydrobenzoate, vinyl propionate, vinyl stearate, and the like.

Pursuant to the instant discovery it has been found that, generally, when the reactants are kept at a temperature in the range of about 30° C. to about 85° C. for at least about 1 hour, say 4 or 5 hours or more, a homopolymeric di-substituted-ethylenephosphonium salt results having the recurring structural unit of Formula I and an intrinsic viscosity below about $[\eta]=0.50$.

The rate at which these polymers of Formula I are formed may be increased by seeding the mixture of reactants with, usually, a small amount of polymer of Formula I. As evidenced by Example XI, infra, the reaction time may be reduced by 75 percent in certain cases. Generally, however, reaction times greater than about one hour are desirable for best results, with or without seeding. The amount of accelerator or seed is not critical, since a very minor amount is beneficial and the upper limit is governed only by practicality of operation.

According to another embodiment of the instant discovery, maintaining the reactants contemplated herein at a temperature in the range of about 120° C. to about 200° C. for a period of time above about one hour results in the production, predominantly, of a cyclic dimer having the configuration of Formula II, above. The only exceptions to this rule are the secondary phosphines of the formula

above, which contain one or two 2-cyanoethyl moieties, such as bis(2-cyanoethyl)phosphine. These reactants at temperatures in the range of about 50° C. to 200° C. yield predominantly the corresponding cyclic dimer II even when heated for periods of time less than about one hour, as evidenced by Examples I and II, infra. When temperatures below about 50° C. are employed the resulting product comprises the corresponding polymers of Formula I.

It is clear from these assertions, therefore, that as a general rule at temperatures in the range of about 30° C. to about 85° C. the polymer I is the preponderant product and at temperatures of about 120° C. to about 200° C. the cylic dimer II is the preponderant product, providing, of course, these temperatures are maintained for at least about one hour.

Pursuant to another embodiment of the present invention it has been found that at temperatures in the intermediate range, i.e., above about 85° C. but below about 120° C., maintained for at least about one hour a mixture composed of polymer I and dimer II results. The ratio of the components of this mixture varies considerably, depending upon the reactants. These components may be separated to recover either the polymer I or the dimer II, or both, as will be evident hereinafter.

Still another embodiment of the present invention is the preparation of a tertiary phosphine monomer of the formula

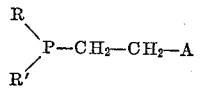

(V)

wherein A is the same as A in Formula IV, above. A secondary phosphine of Formula III, above, and a vinyl compound of Formula IV, above, are reacted at a temperature in the range of about 70° C. to about 85° C. for a period of time less than about one hour, in the presence of a free radial initiator, and the corresponding ester or halide monomer is recovered.

This monomeric compound, pursuant to the instant discovery, may be heated as taught hereinabove to a temperature in any of the ranges specified to produce the corresponding polymer, dimer or mixture thereof, providing, of course, heating is continued for at least about one hour. If desired, reaction may be made to take place without recovery of the monomer but in situ. The remaining conditions given hereinabove for preparation of compounds of Formulae I and II from a secondary phosphine apply equally well to the instant conversion of a tertiary phosphine monomer to its corresponding polymer or dimer.

In the case of the secondary phosphine reactant containing a 2-cyanoethyl moiety, however, its corresponding tertiary phosphine monomer is generally converted in situ to its corresponding polymer I or dimer II, depending upon temperature.

It has been found, furthermore, that the tendency for the monomers contemplated herein to convert to their corresponding polymers and/or dimers may be diminished by the presence of even a small amount of a trialkylphosphine ($C_1$–$C_{12}$), such a trioctylphosphine, tributylphosphine, or the like, added before, during or immediately after reaction of the reactants to produce said monomers. The presence of a trialkylphosphine thus facilitates insolation and/or storage of the monomer which exhibits a tendency to convert to its corresponding polymer and dimer.

From the above, therefore, it can be seen that upon contacting a secondary phosphine with a vinyl ester or halide under the conditions contemplated herein the monomer of Formula V, above, is first formed and recovered, if desired. Recovered or not it may be converted to its corresponding polymer of Formula I or to its corresponding dimer of Formula II, or to a mixture thereof. Thus the instant discovery represents a significant contribution to organophosphorus chemistry.

Reaction pursuant to the present invention is made to take place in the presence of a non-oxidizing free radical initiator, such as di-t-butylperoxide, 2,2-azodiisobutyronitrile, ultraviolet light, X-ray radiation, or the like. In addition, and if desired, a solvent may be employed, such as acetonitrile, heptane, dioxane, methyl ethyl ketone, isopropanol, or the like, which solvent is substantally inert under the conditions of reaction with respect to the reactants, the reaction mixure, or the products.

Among the many secondary phosphines suitable for use in the present invention are: bis(2-cyanoethyl)-phosphine, bis(3 - cyanopropyl)phosphine, methylethylphosphine, bis(2-butoxyethyl)phosphine, dimethylphosphine, diethylphosphine, diisopropylphospine, dibutylphosphine, diisobutylphosphine, didodecylphosphine, dicotylphosphine, bis(2-ethylhexyl)phosphine, bis(2-phenylethyl)phosphine, dicyclohexylphosphine, bis(2 - methoxyethyl)phosphine, bis(2-carbomethoxyethyl)phosphine, dibenzylphosphine, ethylpropylphosphine, diheptylphosphine, and the like.

The use of a very substantial excess of either reactant is contemplated herein, a preferred ratio of reactants being in the range of equimolar proportions up to about 10 moles of the phosphine of Formula III per mole of vinyl acetate, vinyl bromide, or like vinyl compound of Formula IV.

The instant process may be continuous, semi-continuous or batch. Furthermore, suitable results are obtained by operating at atmospheric, sub-atmospheric or super-atmospheric pressures.

It should be noted that when using vinyl bromide, vinyl chloride, dimethylphosphine, or other similar volatile reactants, the reaction is best carried out at super-atmospheric pressures, particularly if temperatures above 70° C. are employed. This of course, is to prevent loss of reactants caused by volatilization.

Generally, with these and like reactants, pressures in the range of 1 atmosphere to 30 atmospheres are suitable. However, substantially higher pressures are contemplated herein.

While the anions referred to hereinabove in the product Formulae I and II are preferred, it will be obvious to the skilled chemist that the carboxylate and halide anions formed as contemplated hereinabove may be converted by anion exchange to numerous other anions by conventional means. The examples, infra, further illustrate this point.

The cyclic dimer products produced herein are advantageously applied to wool, for example, to give protection against injurious insects, such as moths, and the like. The polymeric products herein are particularly useful as anti-static agents for use in textile finishes. These polymers may be applied to the textile by conventional means. For example, a woven fabric may be dipped into an aqueous, alcoholic or other appropriate solution of any one of these polymers. Upon retrieving the fabric from the dip, solvent is removed by air drying, or otherwise, and the resulting polymer-impregnated fabric is thus rendered resistant to annoying static electricity charges.

A mixture of the dimer and homopolymer components, as prepared herein, is likewise useful for wool application and as an anti-static agent; the effectiveness of the mixture for one use or the other depends upon the ratio of its components.

The present invention will best be understood by reference to the following examples which are intended to be illustrative and not unduly limiting to the scope of the invention; for, as will be seen hereinafter, the instant discovery admits of numerous modifications within the skill of the art:

EXAMPLE I

*1,1,4,4-tetrakis(2-cyanoethyl)-1,4-diphosphonia-cyclohexane diacetate*

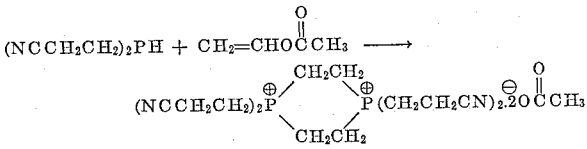

A solution of 18.9 grams (0.22 mole) of vinyl acetate and 1.5 grams (0.01 mole) of 2,2'-azodiisobutyronitrile in 20 milliliters of acetonitrile is added dropwise and continuously over a period of 20 minutes and with stirring to 28.0 grams (0.20 mole) of bis(2-cyanoethyl) phosphine which has been warmed to 76° C. under an atmosphere of nitrogen. The reaction temperature is held at 78° C.–95° C. during admixing of reactants and subsequently by intermittent cooling in a water bath and heating when required. After a total time of 45 minutes (including 20 minutes addition time), the resulting opaque, tan, viscous mixture is cooled to room temperature (21° C.–23° C.) and stirred into 250 milliliters of acetone. Much of the reaction mixture dissolves, leaving 22.5 grams (50 percent by weight of theory) of a white crystalline solid having a melting point of 150° C.–151° C.

A portion of this product material is dissolved in boiling isopropyl alcohol containing a few drops of water, and the resulting solution is diluted with 2 volumes of acetone. After standing several days at −10° C. crystals obtain from this solution, which crystals of 1,1,4,4-tetrakis(2-cyanoethyl) - 1,4 - diphosphoniacyclohexane diacetate, after drying at 53° C. over $P_2O_5$, melt at 149° C.–150° C.

*Analysis.*—Calculated for $C_{20}H_{30}N_4O_4P_2$: P, 13.69. Found: P, 13.60, 13.96.

A portion (2 grams) of this product phosphonium acetate is dissolved in 100 milliliters of water and treated with a saturated aqueous sodium bromide solution. The corresponding phosphonium bromide precipitates and is twice recrystallized from water to obtain 1.9 grams of long needles of 1,1,4,4-tetrakis(2-cyanoethyl)-1,4-diphosphoniacyclohexane dibromide having a melting point of 303° C.–304° C.

*Analysis.*—Calculated for $C_{16}H_{24}Br_2N_4P_2$: Br, 32.34; P, 12.53. Found: Br, 32.81; P, 12.94.

Another small portion of the phosphonium acetate product, above, is dissolved in water and treated with a saturated aqueous potassium iodide solution. The resulting insoluble iodide is recrystallized from water to obtain an analytical sample of 1,1,4,4 - tetrakis(2 - cyanoethyl) - 1,4 - diphosphoniacyclohexane diiodide having a melting point of about 320° C.

*Analysis.*—Calculated for $C_{16}H_{24}I_2N_4P_2$: I, 43.15; P, 10.53. Found: I, 43.19; P, 10.60.

EXAMPLE II

*Reaction of bis(2-cyanoethyl)phosphine with Vinyl Bromide*

$(NCCH_2CH_2)_2PH + CH_2=CHBr \longrightarrow$

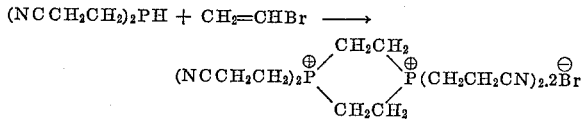

A slow stream of vinyl bromide is passed continuously during a 30-minute period into a stirred solution of 12.5 grams of bis(2-cyanoethyl)phosphine and 0.80 gram of 2,2'-azodiisobutyronitrile in 35 milliliters of acetonitrile heated at 80° C. An oil begins to separate almost immediately. Upon cooling the oil congeals to a white gum which is separated and extracted with hot water. The extract, when cool, deposits 1.8 grams of crystalline solid having a melting point of 300° C.–303° C. A mixed melting point with the bromide salt obtained in Example I, above, is not depressed. Furthermore, the infrared spectra of the two products are identical.

EXAMPLE III

*1,1,4,4-tetrakis(2-carboxyethyl)-1,4-diphosphoniacyclohexane dichloride*

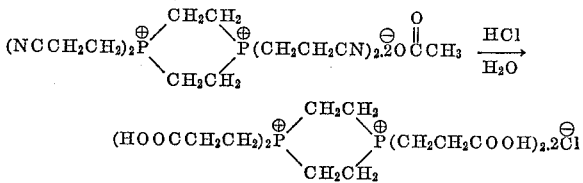

Five grams (0.011 mole) of 1,1,4,4-tetrakis(2-cyanoethyl)-1,4-diphosphoniacyclohexane diacetate produced as in Example I, above, is dissolved in 10 milliliters of warm concentrated HCl. After refluxing 5 minutes the solution congeals to a white mass. An additional 20 cubic centimeters of concentrated HCl is added and the mixture refluxed for 1 hour.

After cooling to room temperature, the resulting solid is filtered and washed with acetone, yielding 5.5 grams of material having a melting point of 259° C.–260° C. Recrystallization of this material from about 6 percent aqueous HCl, followed by recrystallization from aqueous acetone produces 3.7 grams (70 percent by weight of theory) of 1,1,4,4 - tetrakis(2 - carboxyethyl)-1,4-diphosphoniacyclohexane dichloride having a melting point of 280° C.–282° C.

*Analysis.*—Calculated for $C_{16}H_{28}Cl_2O_8P_2$: C, 39.93; H, 5.86; P, 12.87; Cl, 14.73. Found: C, 39.83; H, 6.05; P, 12.85; Cl, 14.72.

EXAMPLE IV

*1,1,4,4-tetrakis(2-butoxyethyl)-1,4-diphosphoniacyclohexane diiodide*

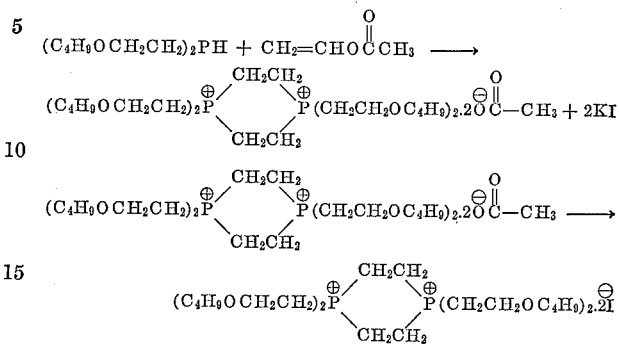

A solution of 12.2 grams (0.05 mole) of bis(2-butoxyethyl)phosphine, 4.5 grams (0.05 mole) of vinyl acetate, 0.5 gram (0.003 mole) of 22'-azodiisobutyronitrile and 10 milliliters of acetonitrile is warmed at 78° C.–84° C. for 30 minutes. A vigorous exothermic reaction occurs, temperature increases to above 100° C. and the reaction mixture becomes dark brown. The resulting weakly basic solution is combined with 100 milliliters of acetone and made acidic (pH 4) with concentrated hydrochloric acid. No precipitation takes place but the color changes from brown to light yellow. A saturated aqueous potassium iodide solution is then added until precipitation is complete. The precipitate (potassium chloride, 4.1 grams) is removed by filtration and the filtrate concentrated to 10 milliliters under vacuum. The concentrate consists of a gummy solid and a supernatant liquid consisting of water and acetic acid. This solid is treated with a mixture of 50 milliliters of acetone and 50 milliliters of ether. A crystalline solid results which is collected by filtration to obtain 3.7 grams of 1,1,4,4-tetrakis(2 - butoxyethyl) - 1,4 - diphosphoniacyclohexane diiodide product having a melting point of about 261° C. The iodide is recrystallized once from 50 percent aqueous ethanol and again from 75 percent ethanol to obtain 2.0 grams of pale yellow needles of 1,1,4,4-tetrakis(2-butoxyethyl)-1,4-diphosphoniacyclohexane diiodide having a melting point of 271° C.–273° C.

*Analysis.* — Calculated for $C_{28}H_{60}I_2O_4P_2$: P, 7.97. Found: P, 7.96.

EXAMPLE V

*1,1,4,4-tetrabutyl-1-1,4-diphosphoniacyclohexane diacetate*

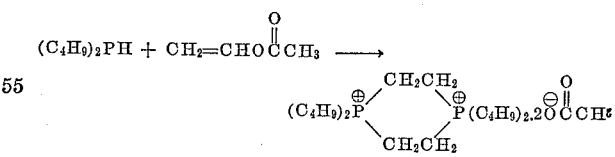

A solution of 73.4 grams (0.5 mole) of dibutylphosphine, 2.0 grams (0.012 mole) of 2,2'-azodiisobutyronitrile, and 100 milliliters of heptane is warmed to 78° C. under an atmosphere of nitrogen, and 43.2 grams (0.5 mole) of vinyl acetate is added dropwise and continuously with stirring during a 15-minute period. The temperature of the mixture is maintained at 78° C.–83° C. during addition by means of intermittent cooling. The resulting reaction mixture is then stirred at 80° C.–85° C. for 1 hour and at 95° C. for 15 minutes. The solvent in the reaction mixture is then removed by distillation under reduced pressure, thus leaving a liquid residue which is heated to 95° C. for 30 minutes, during which time vigorous exotherm results and temperature rises to above about 140° C. and which congeals to a dark brown tarry mass. Next, three hundred milliliters of ether is added to the mixture and the mixture stirred and refluxed for 1 hour. The tarry material dissolves leaving 69.0 grams of a white crystalline solid. A portion of the solid is recrystallized from benzene containing a small amount of ethanol to obtain an analytical sample of 1,1,4,4-tetrabutyl-1,4-diphosphoniacyclohexane diacetate product having a melting point of 195° C.

*Analysis.*—Calculated for $C_{24}H_{50}O_4P_2$: P, 13.33. Found: P, 13.65.

This acetate product is highly soluble in water or ethanol but is insoluble in hot acetone or ethyl acetate.

Ten grams of the product is dissolved in 50 milliliters of water and treated with a saturated aqueous sodium bromide solution until precipitation is complete. The resulting white product is twice recrystallized from butanol to obtain an analytical sample of the corresponding 1,1,4,4 - tetrabutyl-1,4-diphosphoniacyclohexane dibromide having a melting point of 316° C.–319° C.

*Analysis.*—Calculated for $C_{20}H_{44}Br_2P_2$: P, 12.23. Found: P, 12.20.

This bromide is soluble in water and absolute ethanol and insoluble in acetone.

Another ten-gram portion of the acetate product is dissolved in 50 milliliters of water and treated with a saturated aqueous potassium iodide solution until precipitation is complete. The resulting white solid is recrystallized from 500 milliliters of water to obtain 7.8 grams of 1,1,4,4-tetrabutyl-1,4-diphosphoniacyclohexane diiodide having a melting point of 353° C.

*Analysis.*—Calculated for $C_{20}H_{44}I_2P_2$: I, 43.58. Found: I, 43.31, 43.71.

EXAMPLE VI

1,1,4,4-tetradodecyl-1,4-diphosphoniacyclohexane diacetate

A mixture of 7.0 grams (0.02 mole) of didodecylphosphine, 4.8 grams (0.06 mole) of vinyl acetate, 0.5 gram of 2,2'-azodiisobutyronitrile, and 10 milliliters of acetonitrile is heated at 80° C.–85° C. under an atmosphere of nitrogen for 2 hours. The mixture is then heated an additional 2 hours at 130° C. An infrared spectrum of the reaction mixture indicates the presence of acetate ion. The addition of 50 milliliters of acetone precipitates yellow solid. Three recrystallizations from a mixture of ethyl acetate and isopropyl alcohol provide a pure sample of 1,1,4,4-tetradodecyl-1,4-diphosphoniacyclohexane diacetate.

*Analysis.*—Calculated for $C_{56}H_{114}O_4P_2$: C, 73.63; H, 12.58; P, 6.78. Found: C, 70.14; H, 11.67; P, 6.56.

EXAMPLE VII

1,1,4,4-tetracyclohexyl-1,4-diphosphoniacyclohexane diiodide

A mixture of 9.9 grams (0.05 mole) of dicyclohexylphosphine, 4.3 grams (0.05 mole) of vinyl acetate, 0.5 gram of 2,2'-azodiisobutyronitrile, and 10 milliliters of acetonitrile is heated at 80° C.–85° C. under an atmosphere of nitrogen for 2 hours. The mixture is then heated an additional 2 hours at 125° C. The solvent is evaporated under reduced pressure. The solvent is boiled off under an atmosphere of nitrogen until the temperature reaches 150° C. An amber liquid results which is cooled to room temperature (21° C.–23° C.). To induce crystallization a 50-milliliter quantity of ether is added and the white solid thus formed is filtered and washed with ether. An excess of a saturated aqueous potassium iodide solution is added to an aqueous solution of a portion of this product solid. The resulting white solid is filtered off and washed with water; it has a melting point of about 315° C. Purification is effected by boiling the product solid in dimethylformamide, recovering it by filtration, and washing it with acetone. The product thus purified is 1,1,4,4-tetracyclohexyl-1,4-diphosphoniacyclohexane diiodide having a melting point of 317° C.

*Analysis.*—Calculated for $C_{28}H_{52}I_2P_2$: C, 47.74; H. 7.44; P, 8.79. Found: C, 47.62; H, 7.41; P, 8.50.

EXAMPLE VIII

1,1,4,4-tetraisobutyl-1,4-diphosphoniacyclohexane diiodide

A solution of 18.0 grams 0.12 mole) of diisobutylphosphine, 10.6 grams (0.12 mole) of vinyl acetate, and 1.0 gram of ditertiarybutyl peroxide in 20 milliliters of acetonitrile is placed in a 100-milliliter stainless steel pressure vessel and heated at 125° C.–135° C. for 10 hours. The resulting dark brown, viscous reaction product is treated with 75 milliliters of water, and the mixture is extracted with ether. The extract is discarded and the aqueous solution treated with an excess of saturated sodium iodide solution. An insoluble tan solid separates and is collected. It is washed three times with 25-milliliter portions of hot acetone and recrystallized from dimethylformamide to obtain relatively pure phosphonium iodide product, i.e., 1,1,4,4-tetraisobutyl-1-1,4-diphosphoniacyclohexane diiodide.

EXAMPLE IX

1,1,4,4-tetraisobutyl-1,4-diphosphoniacyclohexane diiodide

A solution of 9.0 grams (0.06 mole) of diisobutylphosphine, 5.3 grams (0.06 mole) of vinyl acetate and 10 milliliters of acetonitrile is placed in a clear quartz tube and irradiated with ultraviolet light for 2 hours at 30° C. The reaction mixture is transferred to a flask and the solvent boiled off until the temperature reaches 130° C. The resulting dark brown, viscous mixture is treated with 30 milliliters of water, and the mixture extracted with ether. The extract is discarded, and the aqueous solution treated with an excess of saturated sodium iodide solution. A tan solid separates and is recrystallized from dimethylformamide to obtain the product, 1,1,4,4-tetraisobutyl-1,4-diphosphoniacyclohexane diiodide.

EXAMPLE X

Homopolymeric dibutylethylenephosphonium acetate

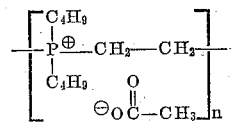

The process of Example V is repeated through the step involving the addition of vinyl acetate at 78° C.–83° C. over a 15 minute period except that isopropanol is used as the solvent instead of heptane. Following said step the reaction mixture is heated at 80° C. for 16 hours, whereupon 300 milliliters of ethyl acetate is used and the reaction mixture is cooled to room temperature and filtered. The resulting filter cake is dried in vacuo and thereby 50 grams of polymeric dibutylethylenephosphonium acetate of melting point 151° C.–155° C. recovered. The polymeric nature of the acetate is confirmed by measuring the intrinsic viscosity of the corresponding bromide salt, the latter being obtained by treating a 25 percent aqueous solution of the acetate salt with aqueous saturated sodium bromide solution and filtering off the precipitated bromide salt. The intrinsic viscosity of the corresponding homopolymeric dibutylethylenephosphonium acetate thus-formed determined in water at 30° C. using a Cannon-Ubbelhode semi-micro dilution viscometer is $[\eta] = 0.267$.

EXAMPLE XI

The process of Example X, above, is repeated except that 0.5 gram of polymeric dibutylethylenephosphonium acetate, prepared as in Example X, is added to the reaction mixture after the addition of vinyl acetate is complete and the reaction time is 4 hours instead of 16 hours. The final polymer has a melting point of 151° C.–154° C. and a similar intrinsic viscosity.

EXAMPLE XII

*Preparation of 1,1,4,4-tetrabutyldiphosphoniacyclohexane diiodide*

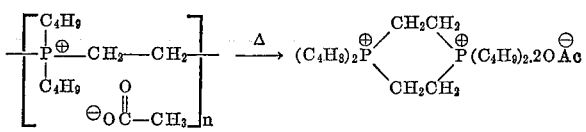

Three grams of a polymeric dibutylethylenephosphonium acetate as prepared in Example XI, above, is heated under nitrogen at 160° C.–165° C. The solid gradually melts to a red oil. The oil is cooled to room temperature and shaken with a mixture of 75 milliliters of benzene and 25 milliliters of water. The benzene phase is separated and washed twice with 25-milliliter portions of water. The aqueous solutions are combined, diluted to 150 milliliters with water and treated with aqueous potassium iodide solution until precipitation is complete. The mixture is filtered to obtain 1.4 grams of white solid. The solid is stirred with 75 milliliters of acetone and filtered to obtain 1.2 grams of the cyclic diphosphonium diiodide, product melting point 337° C.–338° C. (with decomposition). A mixed melting point with an authentic sample as prepared in Example V, supra, is not depressed.

EXAMPLE XIII

*Polymer from dibutylphosphine and vinyl stearate*

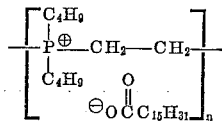

A mixture of 25.0 grams (0.17 mole) of di-n-butylphosphine, 53.1 grams (0.171 mole) of vinyl stearate, and 1.5 grams of $\alpha,\alpha$-azobisisobutyronitrile is stirred and heated at 80° C. for one hour and at 90° C. for 6 hours. The solution is then cooled and treated with 300 milliliters of acetone to obtain 17.6 grams of a white, waxy solid, melting point 203° C.–208° C. and identified as having the recurring structural unit above. Intrinsic viscosity is determined by conventional means and the polymeric nature of the product is established, below about $[\eta]=0.50$.

EXAMPLE XIV

*1,1,4,4-tetra-n-octyl-1,4-diphosphoniacyclohexane diiodide*

A solution of 51.6 grams (0.2 mole) of dioctylphosphine, 18.9 grams (0.22 mole) of vinyl acetate, 1.0 gram of azobisisobutyronitrile, and 250 milliliters of isopropyl alcohol is stirred under nitrogen at 80° C.–83° C. for 2 hours. The solvent is removed under reduced pressure, and the resulting residue heated at about 120° C. for 2 hours. A red liquid results which is cooled and dissolved in 100 milliliters of ether, yielding a solution which is extracted repeatedly with 150-milliliter portions of water until addition of aqueous potassium iodide no longer gives a precipitate. The resulting extracts are then combined and treated with aqueous potassium iodide until precipitation is complete, and the white solid is collected to obtain 26.8 grams of product 1,1,4,4-tetra-n-octyl-1,4-diphosphoniacyclohexane diiodide having a melting point of 265° C.–272° C. Two recrystallizations from aqueous ethanol increases the melting point of the product to 303° C.–304° C.

EXAMPLE XV

*Homopolymeric di-n-octylethylenephosphonium iodide*

A solution of 51.6 grams (0.20 mole) of redistilled dioctylphosphine (boiling point 110° C.–111° C. at 0.2 millimeter mercury), 18.9 grams (0.22 mole) of vinyl acetate, 1.0 gram of azoisobutyronitrile and 200 milliliters of isopropyl alcohol is heated at 79° C.–82° C. with stirring under nitrogen for 5.5 hours. Thirty minutes after the start 0.5 gram of polydi-n-butylethylenephosphonium acetate is added. The resulting yellow reaction mixture is poured into one liter of water, and the resulting precipitated solid collected on a coarse sintered glass funnel, washed with water, and dried over sulfuric acid to obtain 58 grams of the polymer, melting point 142° C.–144° C. Two reprecipitations from isopropyl alcohol with acetone give a product phosphonium acetate polymer melting at 154° C.–156° C.

A solution of 5.0 grams of this phosphonium acetate polymer in 10 milliliters of isopropyl alcohol is treated with aqueous potassium iodide solution. The mixture is poured into 500 milliliters of water and the resulting solid collected and washed with water. Two reprecipitations from isopropyl alcohol with water give a product iodide melting at a temperature over 300° C. and soluble in acetone, benzene, and chloroform. The product is identified as homopolymeric di-n-octylethylenephosphonium iodide by conventional means, i.e., by the use of a Cannon-Ubbelhode semi-micro dilution viscometer, the intrinsic viscosity of the product being determined in acetone at ambient temperature (20° C.–25° C.).

EXAMPLE XVI

*Di-n-butyl-2-acetoxyethylphosphine*

Vinyl acetate (21.5 grams, 0.25 mole) is added during 10 minutes to a stirred mixture of 36.7 grams (0.25 mole) of di-n-butylphosphine, 1.0 gram of azoisobutyronitrile, and 75 milliliters of isopropyl alcohol maintained at 78° C. under nitrogen. The mixture is stirred an additional 30 minutes at 80° C.–82° C. The solvent is removed under reduced pressure, and the resulting residue distilled under high vacuum to obtain 35.0 grams of di-n-butyl-2-acetoxyethylphosphine, boiling point 62° C.–66° C. (0.005 millimeter mercury).

*Analysis.*—Calculated for $C_{12}H_{25}O_2P$: C, 62.04; H, 10.85; P, 13.34. Found: C, 62.45; H, 10.88; P, 13.13.

EXAMPLE XVII

*Quaternization of pure di-n-butyl-2-acetoxyethylphosphine*

A solution of 5.0 grams of the product of Example XVI, above, in 75 milliliters of isopropyl alcohol is refluxed for 24 hours. The solution is cooled and centrifuged to obtain 3.0 grams (60 percent by weight of theory) of its corresponding homopolymeric di-n-butylethylenephosphonium acetate product, melting point 149° C.–153 °C., the polymeric nature of the product being determined by establishing its intrinsic viscosity using a Cannon-Ubbelhode semi-micro dilution-viscometer at 25° C.

EXAMPLE XVIII

The process of Example XVII, above, is repeated in every essential respect except that 0.5 gram of the polymer prepared in Example XVII is added to the new reaction mixture; the reaction time for this repeated experiment is only 3 hours to obtain 3.9 grams (70 percent by weight of theory) of the same product polymer, melting point 149° C.–153° C.

EXAMPLES XIX–XXI

The following table further illustrates the type dimers contemplated herein and the conditions required for their production:

TABLE I

| Example No. | Reactants | | Temperature, °C. | Time in Hours | Free Radical Initiator | Solvent | Product Dimer |
|---|---|---|---|---|---|---|---|
| | Secondary Phosphine | Vinyl Derivatives | | | | | |
| XIX | Bis (2-phenylethyl)-phosphine. | Vinyl acetate | 130 | 3 | Di-t-butylperoxide | Methyl ethyl ketone. | 1,1,4,4-tetra(2-phenylethyl)-1,4-diphosphoniacyclo-hexane diacetate. |
| XX | Bis (2-carbethoxy-ethyl) phosphine. | ___do___ | 125 | 5 | X-ray radiation | Dioxane | 1,1,4,4-tetra(2-carbethoxy-ethyl)-1,4-diphosphonia-cyclohexane diacetate. |
| XXI | Bis (2-carbamylethyl) phosphine. | ___do___ | 145 | 4 | Di-t-butylperoxide | Isopropanol | 1,1,4,4-tetra(2-carbamyl-ethyl)-1,4-diphosphonia-cyclohexane diacetate. |

EXAMPLE XXII

*Quaternization of di-n-butyl-2-acetoxyethylphosphine*

Vinyl acetate (47.5 grams, 0.55 mole) is added dropwise during 15 minutes to a stirred solution of 73.4 grams (0.50 mole) of dibutylphosphine, 2.0 grams of α,α-azabisisobutyronitrile (ABN), and 50 milliliters of heptane maintained at 80° C.–85° C. under nitrogen. The solution is stirred at 80° C.–85° C. for an additional 30 minutes, and then the temperature is raised to 106° C. After several minutes a vigorously exothermic reaction takes place, and the mixture becomes dark brown. The reaction mixture is cooled, diluted with 150 milliliters of ether, and filtered to obtain 30.0 grams of 1,1,4,4-tetrabutyl - 1,4 - diphosphoniacyclohexane diacetate, melting point about 193° C.–194° C. Recrystallization from benzene containing a few drops of ethanol gives material melting at 195° C.

*Analysis.*—Calculated for $C_{24}H_{50}O_4P_2$: P, 13.33. Found P, 13.66.

The diphosphonium diacetate is highly soluble in water and ethanol but insoluble when heated in acetone, ethyl acetate and benzene.

Addition of saturated sodium bromide solution to an aqueous solution of the acetate gives the corresponding diphosphonium dibromide. Recrystallization from butanol gives product melting at 316° C.–319°C.

*Analysis.*—Calculated for $C_{20}H_{44}Br_2P_2$: P, 12.23. Found: P, 12.20.

The bromide is soluble in water and ethanol and insoluble in acetone.

Addition of aqueous potassium iodide to an aqueous solution of the acetate gives the diphosphonium diiodide, which after recrystallization from water melts at 353° C.

*Analysis.*—Calculated for $C_{20}H_{44}I_2P_2$: I, 43.58. Found: I, 43.71.

The filtrate from the diphosphonium diacetate is evaporated to a thick syrup under reduced pressure, and the residue diluted with 900 milliliters of acetone. A tan solid separates and is collected, washed with acetone and with ether, and dried to obtain 53 grams of polydibutyl-ethylene phosphonium acetate, melting point 156° C.–157° C.

EXAMPLES XXIII–XXXII

The following table is intended to show the preparation by anion-exchange of numerous other typical salts producible according to the teachings of the present invention, all anion-exchange reactions being run at ambient temperature (20° C.–23° C.):

TABLE II

| Example No. | Reactants | | Solvent medium | Product |
|---|---|---|---|---|
| | Product of Example | Anion donor* | | |
| XXIII | V (diacetate) | Chloride-charged anion exchange resin | Water | 1,1,4,4-tetrabutyl-1,4-diphosphoniacyclohexane dichloride. |
| XXIV | XXIII | AgF | ___do___ | Do. |
| XXV | X |  Na(C₆H₅)₄B | ___do___ | Homopolymer of dibutylethylenephosphonium tetraphenylboride. |
| XXVI | XIV | Phosphate-charged anion exchange resin. | Methanol | 1,1,4,4-tetra-n-octyl-1,4-diphosphoniacyclohexane diphosphate. |
| XXVII | XXIII | Ag₂SO₄ | Water | 1,1,4,4-tetrabutyl-1,4-diphosphoniacyclohexane disulfate. |
| XXVIII | II | Silver phenyl sulfonate | ___do___ | 1,1,4,4-tetrakis(2-cyanoethyl)-1,4-diphosphonia-cyclohexane diphenylsulfonate. |
| XXIX | XIV | Phosphite-charged anion exchange resin. | ___do___ | 1,1,4,4-tetrabutyl-1,4-diphosphoniacyclohexane diphosphite. |
| XXX | VI | Bis(2-ethylhexyl)phosphate | Methanol | 1,1,4,4-tetradodecyl-1,4-diphosphoniacyclohexane diphosphate. |
| XXXI | VI | Dioctylphosphinic acid charged anion exchange resin. | ___do___ | 1,1,4,4-tetradodecyl-1,4-diphosphoniacyclohexane bis(dioctyl)phosphinate. |
| XXXII | V | Oleic acid charged anion exchange resin. | ___do___ | 1,1,4,4-tetrabutyl-1,4-diphosphoniacyclohexane dioleate. |

*The resins in this table are any commercial or conventional appropriately-charged quaternary ammonium ion exchange resins.

EXAMPLE XXXIII

*Diisobutyl-2-acetoxyethylphosphine*

A solution of 18.0 grams (0.12 mole) of diisobutyl-phosphine, 10.6 grams (0.12 mole) of vinyl acetate, and 0.5 gram of α,α′-azobisisobutyronitrile in 20 milliliters of acetonitrile is heated at 80° C.–85° C. for slightly less than about one hour under nitrogen. The solvent is removed under reduced pressure, and the residue distilled to give 23.4 grams of diisobutyl-2-acetoxyethylphosphine, boiling point 75° C.–84° C. (at 0.35 millimeter Hg.). A center fraction boiling at 80° C.–84° C. (at 0.35 millimeter Hg) is analyzed.

*Analysis.*—Calculated for $C_{12}H_{25}O_2P$: C, 62.04; H, 10.85; P, 13.33. Found: C, 62.28; H, 11.00; P, 13.38.

EXAMPLE XXXIV

*1,1,4,4-Tetraisobutyl-1,4-diphosphoniacyclohexane diiodide*

Diisobutyl - 2 - acetoxyethylphosphine (8.7 grams) is heated at 150° C. for 30 minutes under nitrogen. The resulting dark brown viscous material is dissolved in 5 milliliters of acetone and then poured into 75 milliliters of water. A small top layer separates which is extracted with four 25-milliliter portions of ether. The addition of an excess of saturated potassium iodide solution to the remaining aqueous solution precipitates a tan solid. This solid is filtered, washed with water, and dried. It is washed three times with hot acetone and then recrystallized from dimethylformamide to give 2.4 grams of pure product, melting point about 334° C.

*Analysis.*—Calculated for $C_{20}H_{44}I_2P_2$: C, 40.01; H, 7.38; P, 10.31. Found: C, 40.40; H, 7.34; P, 10.48.

EXAMPLE XXXV

*Reaction of bis(2-cyanoethyl)phosphine with vinyl acetate in the presence of tributylphosphine*

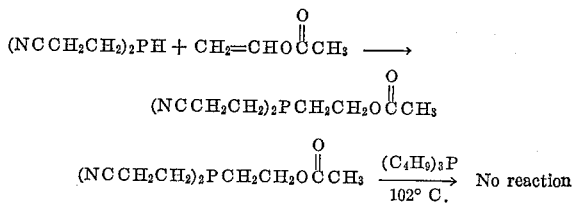

A solution of 7.0 grams (0.05 mole) of bis(2-cyanoethyl)phosphine, 4.7 grams (0.05 mole) of vinyl acetate, 1.0 gram (0.005 mole) of tributylphosphine, 0.5 gram of α,α'-azobisisobutyronitrile and 5 milliliters of acetonitrile is warmed to 50° C. with stirring under nitrogen. A moderately vigorous exothermic reaction occurs and the temperature rises to 80° C.–85° C. where it is maintained by cooling. When the exothermic reaction is over (about 4 minutes) heat is applied and the temperature maintained at 80° C.–85° C. for 15 minutes, and at 85° C.–90° C. for 15 minutes. Finally, the solution is refluxed (102° C.) for 15 minutes. No further reaction takes place. The infrared spectrum of the reaction mixture indicates that bis(2-cyanoethyl)-2-acetoxyethylphosphine is the product. Neither acetate ion or unreacted starting material can be detected.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

The instant application is a continuation-in-part of U.S. application Serial No. 790,388, filed February 2, 1959, now abandoned.

I claim:
1. A 1,1,4,4 - tetra-substituted-1,4-disphosphoniacyclohexane salt of the formula

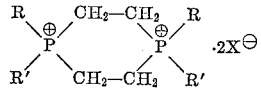

wherein R and R', respectively, represent a member selected from the group consisting of mono-substituted and unsubstituted, branched and straight chain saturated alkyl having from 1 to 12 carbon atoms, and cyclohexyl, said substituents being selected from the group consisting of cyano, phenyl, lower alkoxy, carbalkoxy, carboxy, sulfo and amido, and X is an anion selected from the group consisting of halogen, sulfate, phosphite, phosphate, tetraphenylboride, $\ominus B(C_6H_5)_4$,

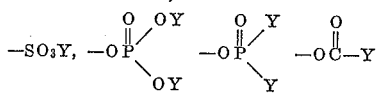

wherein Y in the last four moieties is selected from the group consisting of phenyl, alkyl having from 1 to 18 carbon atoms, and alkenyl having from 1 to 18 carbon atoms.

2. 1,1,4,4 - tetrakis(2-cyanoethyl)-1,4-diphosphoniacyclohexane diacetate.

3. 1,1,4,4 - tetrakis(2-cyanoethyl)-1,4-diphosphoniacyohexane dibromide.

4. 1,1,4,4 - tetrakis(2-carboxyethyl)-1,4-diphosphoniacyclohexane dichloride.

5. 1,1,4,4 - tetrakis(2-butoxyethyl) - 1,4-diphosphoniacyclohexane diiodide.

6. 1,1,4,4 - tetrabutyl-1,4-diphosphoniacyclohexane diacetate.

7. 1,1,4,4-tetradodecyl - 1,4 - diphosphoniacyclohexane diacetate.

8. 1,1,4,4-tetracyclohexyl-1,4-diphosphoniacyclohexane diiodide.

9. 1,1,4,4 - tetraisobutyl-1,4-diphosphoniacyclohexane diiodide.

References Cited by the Examiner
FOREIGN PATENTS 673,451   6/52   Great Britain.

LEON J. BERCOVITZ, *Primary Examiner.*

MILTON STERMAN, LOUISE P. QUAST, DONALD E. CZAJA, *Examiners.*

UNITED STATES PATENT OFFICE
CERTIFICATE OF CORRECTION

Patent No. 3,206,496            September 14, 1965

Michael M. Rauhut

It is hereby certified that error appears in the above numbered patent requiring correction and that the said Letters Patent should read as corrected below.

Column 1, line 57, for "(IF)" read -- (IV) --; column 3, line 60, for "dicotylphosphine" read -- dioctylphosphine --; column 6, lines 55 to 58, for that portion of the formula reading $$CCH^2 \quad\quad \text{read} \quad\quad CCH_3$$

column 8, line 6, for "0.12 mole)" read -- (0.12 mole) --; column 9, line 7, second structure, the radical $$(C_4H_8) \quad\quad \text{read} \quad\quad (C_4H_9)$$

columns 11 and 12, TABLE II, under the heading Product, third line thereof, for "Do" read -- 1,1,4,4-tetrabutyl-1,4-diphosphoniacyclohexane difluoride --.

Signed and sealed this 12th day of April 1966.

(SEAL)
Attest:

ERNEST W. SWIDER            EDWARD J. BRENNER
Attesting Officer            Commissioner of Patents